Patented Nov. 21, 1950

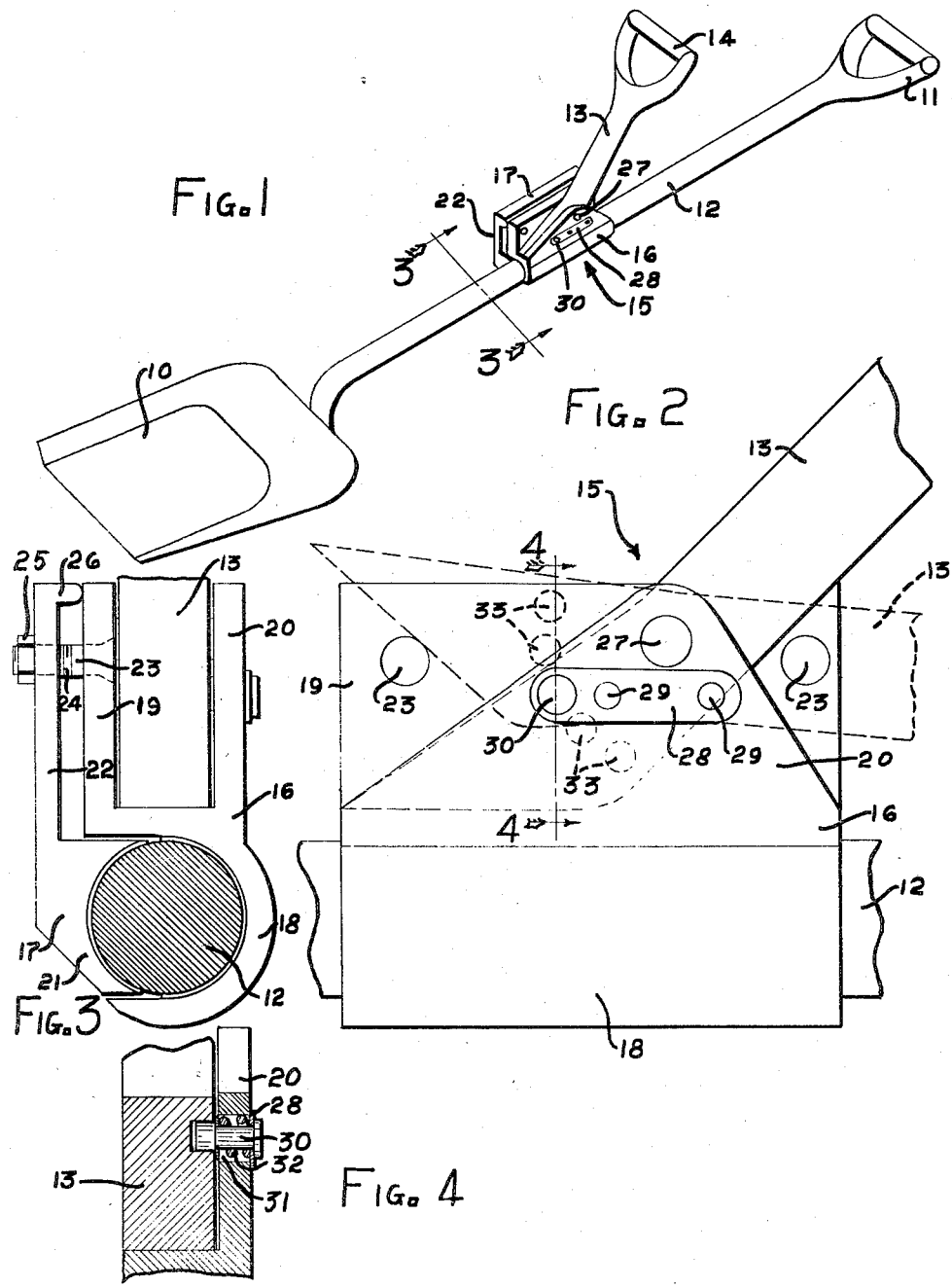

2,531,227

UNITED STATES PATENT OFFICE 2,531,227

SHOVEL WITH AUXILIARY HANDLE

Ross G. Lubins, St. Paul, Minn.

Application February 4, 1948, Serial No. 6,244

3 Claims. (Cl. 294—58)

This invention has relation to a shovel with auxiliary handle.

An object of the invention is to provide a new and improved shovel, or like implement, such as a spade, scoop, pitchfork, etc., including an auxiliary handle.

A further object is to provide a shovel wherein will be incorporated desirable and improved features and characteristics of construction novel both as individual entities of the shovel and in combination with each other.

And a further object is to provide a shovel with auxiliary handle of construction as hereinafter set forth.

With the above objects in view, as well as others which will appear as the specification proceeds, the invention comprises the construction, arrangement and combination of parts as now to be fully described and as hereinafter to be specifically claimed, it being understood that the disclosure herein is merely illustrative and intended in no way in a limiting sense, changes in details of construction and arrangement of parts being permissible as long as within the spirit of the invention and the scope of the claims which follow.

In the accompanying drawing forming a part of this specification,

Fig. 1 is a perspective view of a shovel with auxiliary handle made according to the invention;

Fig. 2 is an enlarged fragmentary side elevational view of the disclosure of Fig. 1;

Fig. 3 is a detail sectional view, taken on line 3—3 in Fig. 1; and

Fig. 4 is a detail sectional view, taken on line 4—4 in Fig. 2.

With respect to the drawing and the numerals of reference thereon, an ordinary shovel there shown consists of a blade or scoop 10, a main grip or hand hold 11 and a main shank 12 between and integral or rigid with said blade or scoop and said main grip or hand hold. The blade or scoop, the main shank and the main grip or hand hold are substantially in alinement, and the working edge of said blade or scoop is at an end thereof opposite said main shank.

An auxiliary handle of the shovel of the invention is constituted as an auxiliary shank 13 integrally or rigidly connected to an auxiliary grip or hand hold 14 and means, respresented generally at 15, for adjustably and removably supporting the auxiliary handle on the main shank 12. The auxiliary shank and the auxiliary grip or hand hold are substantially in alinement, said auxiliary grip or hand hold is at the outer end of said auxiliary shank and the means 15 is at the inner end of the auxiliary shank.

Said means 15 includes a pair of complementary elements one of which, denoted 16, adjustably supports the auxiliary shank 13 and the other of which, represented 17, is adapted to be detachably connected to said element 16.

The element 16 is of elongated configuration and includes a part-cylindrical portion 18, and said element 16 also includes spaced apart, parallel supporting straps, indicated 19 and 20, respectively, at the upper side of, parallel to and integral or rigid with the part-cylindrical portion 18.

The element 17 is of elongated configuration and includes a part-cylindrical portion 21, and said element 17 also includes a supporting strap 22 at the upper side of, parallel to and integral or rigid with the part-cylindrical portion 21.

The complementary elements 16 and 17 are adapted to be removably supported upon the main shank 12, for adjustable movement to any selected position along said main shank, with the supporting straps 19, 20 and 22 situated above the main shank 12. Spaced apart bolts 23, fixed in the supporting strap 19 and freely received in apertures through the supporting strap 22, include threaded portions 24 which removably receive nuts 25 for fastening a flange 26 upon an upper portion of said supporting strap 22 up against said supporting strap 19. The construction and arrangement as illustrated and described are provision for rigidly securing the means 15 on main shanks such as the main shank 12 which may vary in cross-sectional dimension.

The inner end portion of the auxiliary shank 13 is situated between and pivotally mounted upon the supporting straps 19 and 20. More explicitly, a pin 27 in said inner end portion of said auxiliary shank 13 has its opposite end portions mounted in alined openings in said supporting straps 19 and 20, in such manner that the auxiliary shank is supported for swinging movement in a plane passed longitudinally through the main shank 12 in perpendicular relation to the grips or hand holds 11 and 14.

Mechanism is included for adjustably fixing the auxiliary shank 13 and auxiliary grip or hand hold 14 of the auxiliary handle at desired angular relation to the main shank 12. More explicitly, a flat retaining member 28, fixed, as at 29, upon an outer surface of the supporting strap 20, slidably supports a locking pin 30 situated in an opening 31 in said supporting strap 20 and resiliently urged inwardly by a compression coil spring 32.

The locking pin 30 is adapted to be snugly, selectively received in apertures 33 spaced apart across the width of the auxiliary shank 13 and situated between the pin 27 and the inner end of said auxiliary shank.

In Fig. 1 of the drawing, and in full lines in Fig. 2, the auxiliary shank 13 is situated as when the locking pin 30 is in the uppermost aperture 33 and said auxiliary shank is at an angular relation to the main shank 12 with the auxiliary grip or hand hold 14 above and inwardly of the main grip or hand hold 11. In dotted lines in said Fig. 2, the auxiliary shank is situated as when said locking pin 30 is in the lowermost aperture 33 and said auxiliary shank is in parallel relation to said main shank and out of use. When the locking pin 30 is situated in the intermediate aperture 33, the auxiliary shank 13 will be situated at an angle to the main shank 12 less than that at which said auxiliary shank is disclosed in Fig. 1 and in full lines in Fig. 2. Additional apertures such as 33 of course can be employed. Inasmuch as the complementary elements 16 and 17 and the auxiliary handle are adjustable longitudinally of the main shank, the auxiliary grip or hand hold can be situated closer to or farther from the main grip or hand hold, depending upon the desire of a workman.

What is claimed is:

1. A shovel with auxiliary handle comprising a blade, a main grip, a main shank between and rigidly connected to said blade and main grip, said blade, main shank and main grip being substantially in alinement and a working edge of said blade being opposite said main shank, an auxiliary grip, an auxiliary shank rigidly connected to said auxiliary grip, a first element including a first part-cylindrical portion and spaced apart supporting straps at a side of, parallel to and rigid with said first part-cylindrical portion, a second element including a second part-cylindrical portion and a supporting strap at a side of, parallel to and rigid with said second part-cylindrical portion, means securing the supporting strap of said second element to a supporting strap of said first element with the first and second part-cylindrical portions in facing, substantially concentric relation, and means for fastening an end portion of said auxiliary shank opposite said auxiliary grip to and between said supporting straps of said first element.

2. A shovel with auxiliary handle comprising a blade, a main grip, a main shank between and rigidly connected to said blade and main grip, said blade, main shank and main grip being substantially in alinement and a working edge of said blade being opposite said main shank, an auxiliary grip, an auxiliary shank rigidly connected to said auxiliary grip, a first element including a first part-cylindrical portion and spaced apart supporting straps at a side of, parallel to and rigid with said first part-cylindrical portion, a second element including a second part-cylindrical portion and a supporting strap at a side of, parallel to and rigid with said second part-cylindrical portion, means securing the supporting strap of said second element to a supporting strap of said first element with the first and second part-cylindrical portions in facing, substantially concentric relation, means rotatably supporting an end portion of said auxiliary shank opposite said auxiliary grip upon and between said supporting straps of said first element, and devices for selectively fastening said auxiliary shank in fixed relation to said main shank in any of several different positions to which the auxiliary shank is capable of rotative adjustment.

3. A shovel with auxiliary handle comprising a blade, a main grip, a main shank between and rigidly connected to said blade and main grip, said blade, main shank and main grip being substantally in alinement and a working edge of said blade being opposite said main shank, an auxiliary grip, an auxiliary shank rigidly connected to said auxiliary grip, a first element including a first part-cylindrical portion and spaced apart supporting straps at a side of, parallel to and rigid with said first part-cylindrical portion, a second element including a second part-cylindrical portion and a supporting strap at a side of, parallel to and rigid with said second part-cylindrical portion, a flange upon a part of the supporting strap of said second element in spaced relation to said second part-cylindrical portion and adjacent relation to said first element, means for adjustably securing said supporting strap of the second element to and in substantially parallel relation with a supporting strap of said first element with the first and second part-cylindrical portions in facing, substantially concentric relation and said flange engaged against said first element, means rotatably supporting an end portion of said auxiliary shank opposite said auxiliary grip upon and between said supporting straps of said first element, and devices for selectively fastening said auxiliary shank in fixed relation to said main shank in any of several different positions to which the auxiliary shank is capable of rotative adjustment.

ROSS G. LUBINS.

REFERENCES CITED

The following references are of record in the file of this patent:

UNITED STATES PATENTS

| Number | Name | Date |
|---|---|---|
| 702,097 | Haviland | June 10, 1902 |
| 1,083,054 | Brown | Dec. 30, 1913 |